US012560876B2

(12) United States Patent
Fujikawa

(10) Patent No.: US 12,560,876 B2
(45) Date of Patent: Feb. 24, 2026

(54) IMAGE FORMING APPARATUS

(71) Applicant: CANON KABUSHIKI KAISHA, Tokyo (JP)

(72) Inventor: Tomoki Fujikawa, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 6 days.

(21) Appl. No.: 18/818,880

(22) Filed: Aug. 29, 2024

(65) Prior Publication Data

US 2025/0076785 A1 Mar. 6, 2025

(30) Foreign Application Priority Data

Sep. 5, 2023 (JP) ................................ 2023-143916

(51) Int. Cl.

*G03G 15/00* (2006.01)
*G03G 15/08* (2006.01)
*G03G 21/16* (2006.01)

(52) U.S. Cl.

CPC ..... *G03G 15/0865* (2013.01); *G03G 15/0856* (2013.01); *G03G 15/0863* (2013.01); *G03G 15/553* (2013.01); *G03G 15/556* (2013.01); *G03G 21/1633* (2013.01); *G03G 21/1676* (2013.01); *G03G 2221/1654* (2013.01); *G03G 2221/183* (2013.01)

(58) Field of Classification Search

CPC ........... G03G 15/0856; G03G 15/0863; G03G 15/0865; G03G 15/5075; G03G 15/5083; G03G 15/553; G03G 15/556; G03G 21/1633; G03G 21/1676; G03G 2221/1654; G03G 2221/183

See application file for complete search history.

(56) References Cited

U.S. PATENT DOCUMENTS

| | | | | |
|---|---|---|---|---|
| 6,560,416 | B2 * | 5/2003 | Fischer | G03G 15/0856 399/258 |
| 8,437,648 | B2 | 5/2013 | Tachibana | |
| 12,443,137 | B2 * | 10/2025 | Nitta | G03G 21/1676 |
| 2004/0223774 | A1 * | 11/2004 | Shimada | G03G 15/0121 399/27 |

(Continued)

FOREIGN PATENT DOCUMENTS

| | | |
|---|---|---|
| JP | 2005091462 A | 4/2005 |
| JP | 2011008142 A | 1/2011 |

*Primary Examiner* — Sophia S Chen

(74) *Attorney, Agent, or Firm* — ROSSI, KIMMS & McDOWELL LLP

(57) ABSTRACT

An image forming apparatus includes a control unit that controls a state of a restricting unit to switch between a restricted state in which a plurality of consumable units are restricted from being removed and an unrestricted state in which the plurality of consumable units are not restricted from being removed. In a first state in which a contract for a service for using the consumable unit of the specific type provided by a service provider is in effect, the control unit sets the restricting unit to the restricted state in a case where all the plurality of consumable units mounted in the image forming apparatus are consumable units of the specific type, and sets the restricting unit to the unrestricted state in a case where at least one of the plurality of consumable units mounted in the image forming apparatus is the normal consumable unit.

18 Claims, 10 Drawing Sheets

(56) References Cited

U.S. PATENT DOCUMENTS

| | | | | |
|---|---|---|---|---|
| 2018/0164725 | A1* | 6/2018 | Takahashi .......... | G03G 21/1676 |
| 2023/0314997 | A1* | 10/2023 | Imanishi .............. | G03G 15/553 |
| | | | | 399/12 |

* cited by examiner

FIG. 10A

STORAGE LOCATION INFORMATION OF CARTRIDGE MEMORY

| ITEM | VALUE |
|---|---|
| SERIAL NO. | 12345 |
| MODEL INFORMATION | LBPXXXX |
| CARTRIDGE COLOR INFORMATION | Y |
| DEDICATED CRG INFORMATION | TRUE |

FIG. 10B

STORAGE LOCATION INFORMATION OF CARTRIDGE MEMORY

| ITEM | VALUE |
|---|---|
| DETERMINATION REFERENCE TIME | 10000 SECONDS |
| CUMULATIVE ROTATION TIME | 6000 SECONDS |
| DETERMINATION REFERENCE DISTANCE | 5000m |
| CUMULATIVE ROTATION DISTANCE | 3500m |
| REMAINING TONER AMOUNT | 25% |
| UNLOCKING THRESHOLD | 5% |

FIG. 10C

STORAGE LOCATION INFORMATION OF MAIN BODY MEMORY

| ITEM | VALUE |
|---|---|
| SERIAL NO. | L01234 |
| MODEL INFORMATION | LBPXXXX |

FIG. 10D

STORAGE LOCATION INFORMATION OF MAIN BODY MEMORY

| ITEM | VALUE |
|---|---|
| CONTRACT STATE | CONTRACTED |
| SERIAL NO. (Y) | 12345 |
| REMAINING LIFESPAN VALUE (Y) | 25% |
| DEDICATED CRG INFORMATION (Y) | TRUE |
| SERIAL NO. (M) | 67890 |
| REMAINING LIFESPAN VALUE (M) | 25% |
| DEDICATED CRG INFORMATION (M) | TRUE |
| SERIAL NO. (C) | 98765 |
| REMAINING LIFESPAN VALUE (C) | 25% |
| DEDICATED CRG INFORMATION (C) | TRUE |
| SERIAL NO. (K) | 55555 |
| REMAINING LIFESPAN VALUE (K) | 25% |
| DEDICATED CRG INFORMATION (K) | FALSE |

IMAGE FORMING APPARATUS

BACKGROUND OF THE INVENTION

Field of the Invention

The present invention relates to an image forming apparatus.

Description of the Related Art

In image forming apparatuses in which a removable consumable unit, such as a toner container or a process cartridge including a toner container, is mounted, a technique is known in which the consumable unit is used up before the unit reaches the end of its lifespan. Using up the consumable unit before until the unit reaches the end of its lifespan makes it possible to reduce the frequency at which the consumable unit needs to be replaced.

For example, Japanese Patent Laid-Open No. 2005-091462 discloses a technique in which a stopper of a process cartridge is set to be deactivated (disengaged), such that the process cartridge can be mounted and removed, only when a replacement time of the process cartridge is detected. Japanese Patent Laid-Open No. 2011-008142 discloses a technique in which a cover of a toner container is locked, a toner container replacement screen is displayed when the toner container is detected to have no toner, and the cover corresponding to the toner container is unlocked through an input made in the replacement screen. This restricts the consumable unit, such as the process cartridge or the toner container, from being removed from the image forming apparatus until the consumable unit reaches the end of its lifespan.

There is a printing service, provided by a service provider, in which a dedicated cartridge (process cartridge) for the service is mounted in an image forming apparatus, and a flat fee or a page-by-page fee is charged when images are formed using the cartridge. Such a printing service can require a user to mount the dedicated cartridge provided by the service provider in the image forming apparatus.

When, for example, a door of the image forming apparatus is locked in order to restrict the cartridge from being removed from the image forming apparatus as described above, a situation can arise in which the door is locked when a dedicated cartridge and a normal cartridge are mounted at the same time. Such a situation can occur, for example, if the user accidentally closes the door while in the process of replacing a plurality of cartridges. Here, it is necessary to unlock the door in order to continue replacing the cartridges, but it may be necessary to perform complicated operations in a console, and, in some cases, request the service provider to dispatch a worker, to unlock the door.

SUMMARY OF THE INVENTION

Accordingly, the present disclosure provides a technique for improving usability when replacing a removable consumable unit in an image forming apparatus.

According to an aspect of the present invention, there is provided an image forming apparatus in which a consumable unit of a specific type and a normal consumable unit not of the specific type can be mounted, the image forming apparatus comprising: a restricting unit configured to, when a plurality of consumable units used to form an image on a recording material are mounted in the image forming apparatus, restrict the plurality of consumable units from being removed from the image forming apparatus; and a control unit configured to control a state of the restricting unit to switch between a restricted state in which the plurality of consumable units are restricted from being removed and an unrestricted state in which the plurality of consumable units are not restricted from being removed, wherein in a first state in which a contract for a service for using the consumable unit of the specific type provided by a service provider is in effect, the control unit sets the restricting unit to the restricted state in a case where all the plurality of consumable units mounted in the image forming apparatus are consumable units of the specific type, and sets the restricting unit to the unrestricted state in a case where at least one of the plurality of consumable units mounted in the image forming apparatus is the normal consumable unit.

Further features of the present invention will become apparent from the following description of exemplary embodiments (with reference to the attached drawings).

BRIEF DESCRIPTION OF THE DRAWINGS

FIGS. 10A to 10D illustrate an example of information stored in a cartridge memory 71 and a main body memory 72.

DESCRIPTION OF THE EMBODIMENTS

Figure 1:
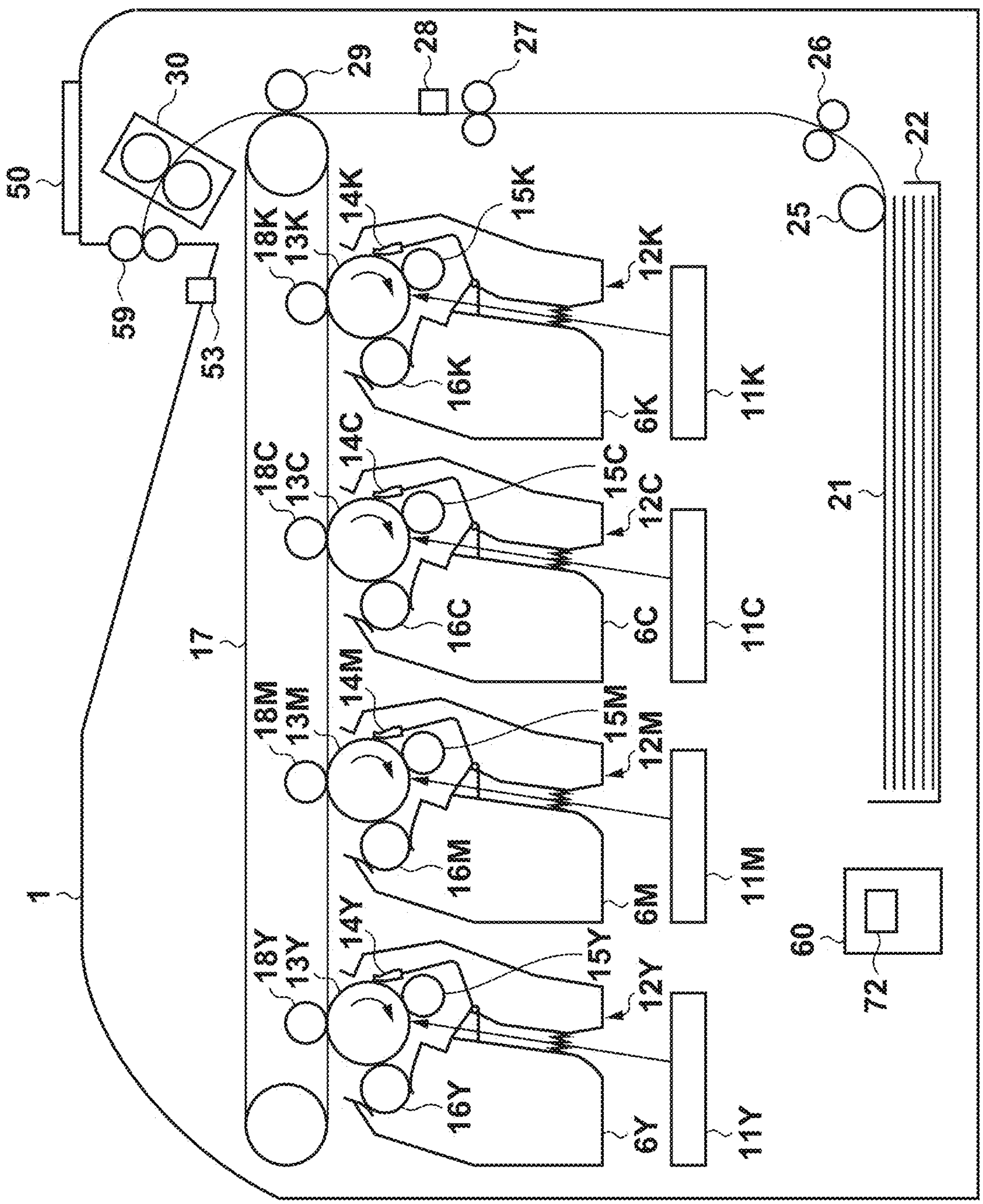
FIG. 1 is a cross-sectional view illustrating an example of the hardware configuration of an image forming apparatus 1.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An electrophotographic laser beam printer (LBP) will be described as an example of an image forming apparatus according to embodiments of the present disclosure. However, the image forming apparatus is not intended to be limited to an LBP, and may be another type of image forming apparatus, such as a copier, a facsimile device, an ink jet printer, or the like.

Image Forming Apparatus

FIG. 1 is a cross-sectional view schematically illustrating the hardware configuration of an image forming apparatus 1 according to a first embodiment. The image forming apparatus 1 is configured to electrophotographically form images onto a recording material. The image forming apparatus 1 is configured to be capable of forming a full-color image by superimposing yellow, magenta, cyan, and black toner images. Although the image forming apparatus 1 of the present embodiment employs an intermediate transfer technique, the image forming apparatus 1 may be configured as a laser beam printer that employs a direct transfer technique in which a toner image is transferred from a photosensitive member (a photosensitive drum) to the recording material without traversing an intermediate transfer member (an intermediate transfer belt).

The image forming apparatus 1 includes laser scanners 11Y, 11M, 11C, and 11K, and process cartridges (cartridges) 12Y, 12M, 12C, and 12K that can be mounted in and removed from the image forming apparatus 1. Note that the letters Y, M, C, and K appended to the reference signs indicate yellow (Y), magenta (M), cyan (C), and black (K) toner colors, respectively, and will be omitted in descriptions of matters that are the same for all colors. In the image forming apparatus 1, the laser scanner 11Y and the cartridge 12Y constitute image forming units for forming Y toner images, and the same applies to image forming units corresponding to M, C, and K.

Each cartridge 12 includes a photosensitive drum 13, a drum cleaner 14, a charging roller 15, a developing roller 16, a toner container 6, and a remaining toner amount sensor 62. The cartridge 12 is a consumable unit that can be mounted in and removed from the image forming apparatus 1, and is an example of a consumable unit used for forming an image onto a recording material. Although the present embodiment describes an example in which the consumable unit is constituted by a process cartridge (the cartridge 12), the consumable unit is not limited thereto. For example, a consumable unit that can be mounted in and removed from the image forming apparatus 1, and that is used to form images onto a recording material, may be constituted by a toner container containing toner.

In the cartridge 12, the photosensitive drum 13 is an image carrier that carries an electrostatic latent image and a toner image formed by developing the electrostatic latent image using the toner. The photosensitive drum 13 is driven to rotate at a predetermined rotational speed in the direction of the arrow indicated in FIG. 1. The drum cleaner 14 is disposed so as to make contact with the photosensitive drum 13. An intermediate transfer belt 17 is disposed at a position that brings the intermediate transfer belt 17 into contact with the photosensitive drums 13Y, 13M, 13C, and 13K. In addition, primary transfer rollers 18Y, 18M, 18C, and 18K are disposed at positions opposite the photosensitive drums 13Y, 13M, 13C, and 13K, respectively, with the intermediate transfer belt 17 located therebetween.

The charging roller 15 uniformly charges the surface of the photosensitive drum 13. The laser scanner 11 forms an electrostatic latent image on the surface of the photosensitive drum 13 by exposing the photosensitive drum 13 with a laser beam modulated based on an image signal (image data). The developing roller 16 forms the toner image on the photosensitive drum 13 by developing the electrostatic latent image formed on the photosensitive drum 13 using toner (a developing agent) supplied from the toner container 6.

The toner image formed on the photosensitive drum 13 is transferred onto an intermediate transfer belt 17 at a transfer position (a primary transfer part) by the primary transfer roller 18. At this time, toner images of four colors, namely Y, M, C, and K, formed on the photosensitive drums 13Y, 13M, 13C, and 13K, respectively, are sequentially superimposed and transferred onto the intermediate transfer belt 17. The toner images formed on the intermediate transfer belt 17 are conveyed to a secondary transfer part, which is a point of contact between the intermediate transfer belt 17 and a secondary transfer roller 29, in accordance with the rotation of the intermediate transfer belt 17. At the secondary transfer part, the toner image on the intermediate transfer belt 17 is transferred onto a sheet (paper) 21 conveyed along a conveyance path from a cassette (storage unit) 22.

The sheets 21 are stored in the cassette 22 in a stacked state. A paper feed roller 25, a conveyance roller 26, a registration roller 27, and a registration sensor 28 are disposed in the conveyance path for conveying the sheets 21 from the cassette 22 to the secondary transfer part. The sheet 21 in the cassette 22 is fed to the conveyance path by the paper feed roller 25, and the conveyance roller 26 conveys the sheet 21 toward the registration roller 27 along the conveyance path.

The sheet 21 conveyed to the registration roller 27 is conveyed to the secondary transfer part by the registration roller 27 at a conveyance speed corresponding to the rotational speed of the intermediate transfer belt 17 at a predetermined control timing. At the secondary transfer part, the toner image on an intermediate transfer belt 17 is transferred onto the sheet 21 by the secondary transfer roller 29.

A fixer 30 and a discharge roller 59 are installed downstream from the secondary transfer roller 29 in the conveyance direction of the sheets 21. A sheet sensor 53 for detecting the sheet 21 discharged onto the discharge tray is provided in the vicinity of the discharge roller 59. The sheet 21 onto which the toner image has been transferred by the secondary transfer roller 29 is conveyed to the fixer 30. The fixer 30 includes a fixing roller, which is a heating member, and a pressure roller, which is a pressure member disposed opposite the fixing roller. The fixer 30 performs fixing processing for fixing the transferred toner image onto the sheet 21 by applying heat and pressure to the sheet 21 using the fixing roller and the pressure roller. The sheet 21 subjected to the fixing processing is discharged onto the discharge tray by the discharge roller 59.

The image forming apparatus 1 further includes a console 50 and a control unit (control board) 60. The control unit 60 has a main body memory 72. For example, model information of the image forming apparatus 1 is stored in the main body memory 72 in advance when the image forming apparatus 1 is shipped from the factory. The console 50 includes a display unit for displaying (communicating) information to a user and an input unit for accepting the input of information by accepting operations made by the user.

Configuration Related to Cartridge Mounting and Removal

Figure 2A:
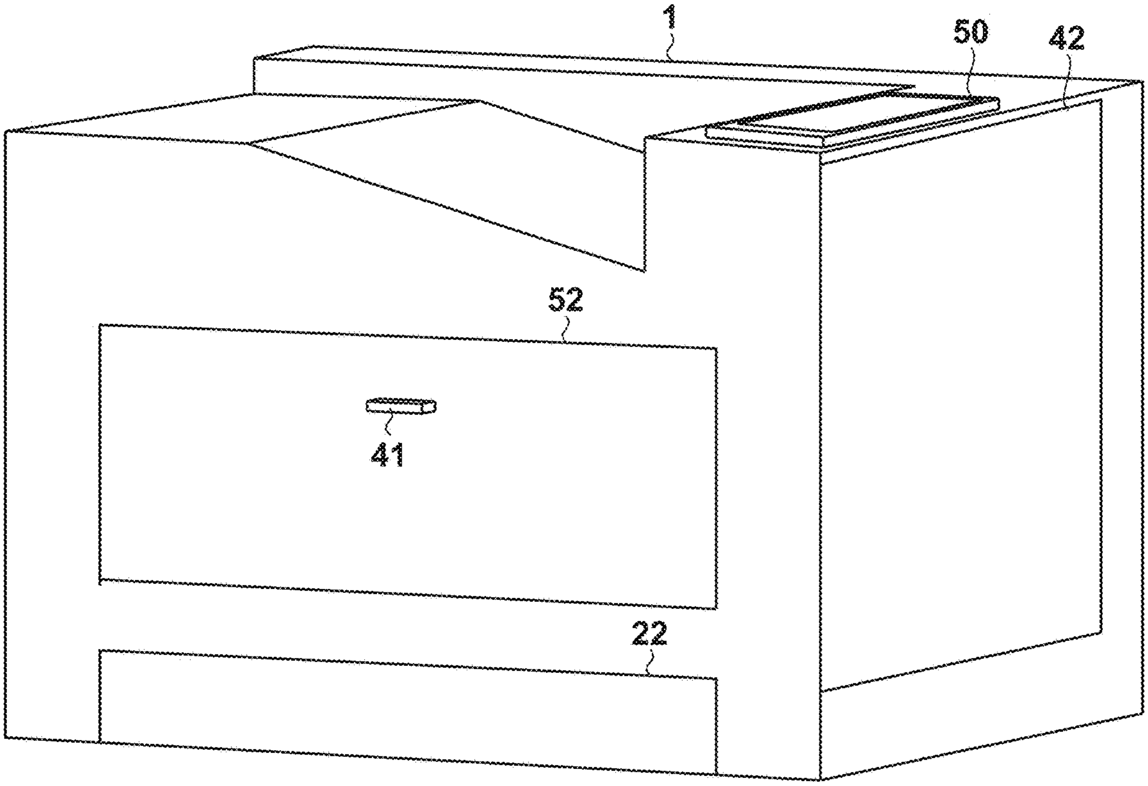
FIGS. 2A and 2B are schematic perspective views illustrating an example of a configuration related to the mounting and removal of a cartridge 12.
Figure 2B:
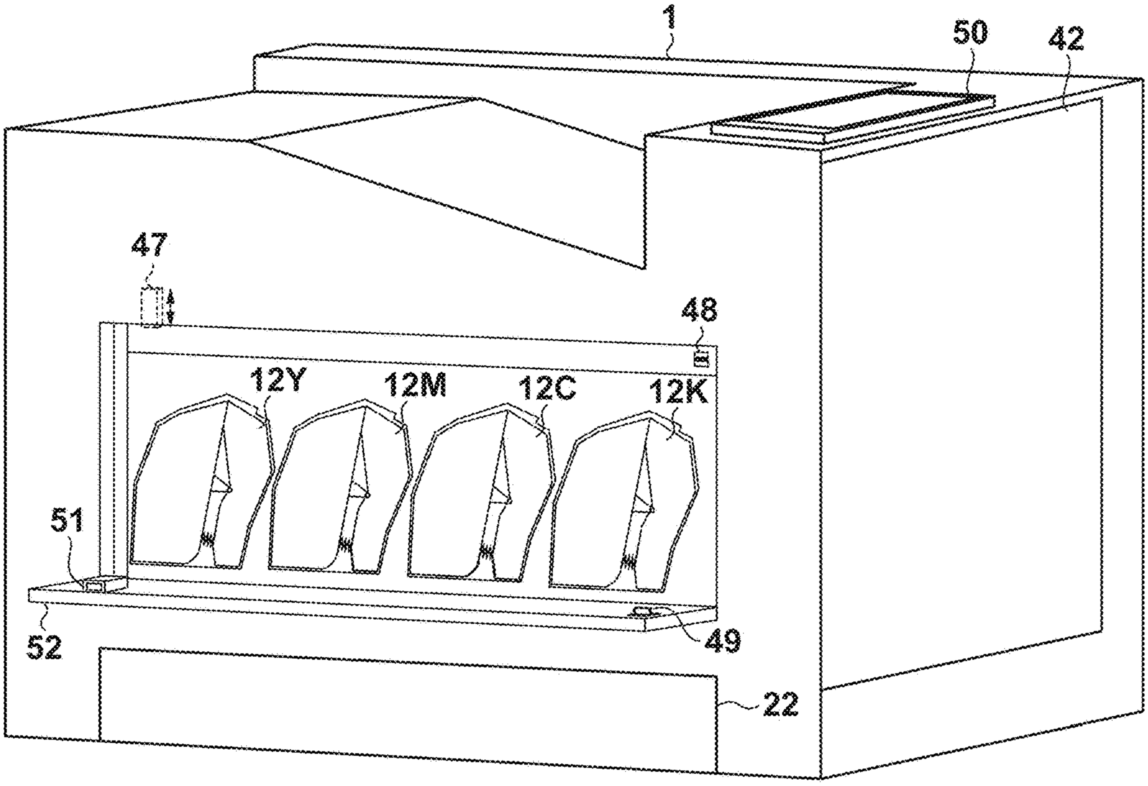

FIGS. 2A and 2B are schematic perspective views illustrating an example of a configuration related to the mounting and removal of the cartridge 12 in the image forming apparatus 1 of the present embodiment. FIG. 2A illustrates a case where a door 52 provided in the main body of the image forming apparatus 1 is closed. FIG. 2B illustrates a case where the door 52 is open.

The door 52 is configured to enable access to the consumable unit (the cartridge 12) mounted to (the inside of) the image forming apparatus 1 when open, and to disable access when closed. One door 52 is provided in the main body of the image forming apparatus 1 for all of the cartridges 12. The door 52 is provided with an operation member 41 used by the user to open and close the door 52. When the door 52 is open, the cartridges 12 can be mounted inside the (main body of the) image forming apparatus 1, and the cartridges 12 can be removed from inside the (main body of the) image forming apparatus 1.

After a new unit (cartridge 12 or the like) is mounted in the image forming apparatus 1, the unit is used, and the replacement time for the unit arrives, it is necessary to replace that unit with a new unit. Note that "replacement time" corresponds to, for example, a time at which a predetermined image quality cannot be maintained when images are formed using the mounted unit, and is also referred to as the "lifespan" herein.

The image forming apparatus 1 of the present embodiment is further provided with a door 42 as a door for enabling access to the inside of the main body. Opening the door 42 enables the user to access the conveyance path. The door 42 is used, for example, when a sheet 21 being conveyed jams, for the user to access the conveyance path and remove the sheet 21 jammed in the conveyance path.

As illustrated in FIG. 2B, the image forming apparatus 1 includes a locking pin 47, and a locking member 51 disposed in the door 52 to form a pair with the locking pin 47. The locking pin 47 is configured to restrict the door 52 from moving from being closed to being open. The locking member 51 is disposed in a position where the locking pin 47 and the locking member 51 fit together when the door 52 is closed. The image forming apparatus 1 further includes a door sensor 48, which is a sensor for detecting whether the door 52 is open or closed, and a member 49, which is used by the door sensor 48 to detect whether the door 52 is open or closed.

In the present embodiment, the locking pin 47 and the locking member 51 constitute a locking mechanism that locks the door 52 closed. The locking pin 47 and the locking member 51 are examples of a restricting unit that restrict the consumable unit from being removed from the image forming apparatus 1 when the consumable unit is mounted in the image forming apparatus 1.

Door Locking Mechanism and Open/Closed Detection Mechanism

Figure 3A:
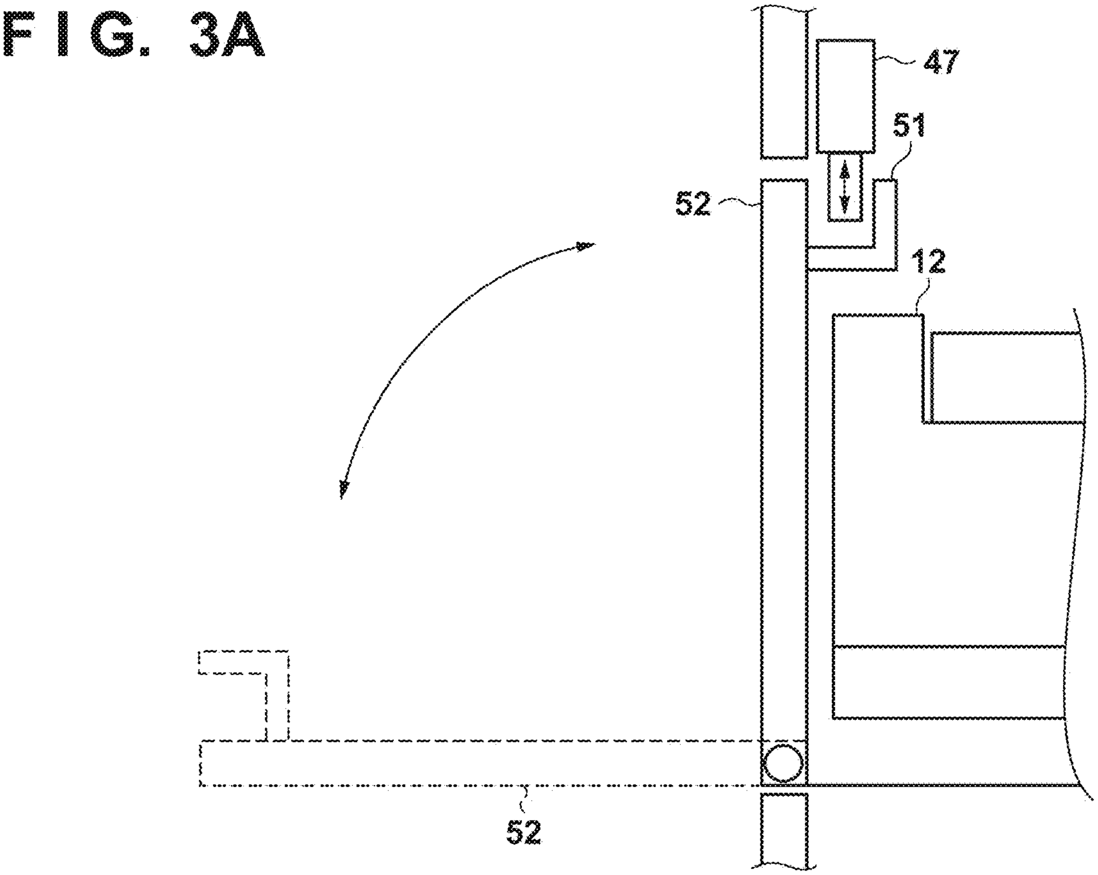
FIGS. 3A and 3B are schematic cross-sectional views illustrating an example of the configuration of a locking mechanism and an open/closed detection mechanism of a door 52.

FIG. 3A is a schematic cross-sectional view illustrating an example of the configuration of the locking mechanism of the door 52 in the image forming apparatus 1 of the present embodiment. As illustrated in FIG. 3A, part of the locking pin 47 protrudes into the locking member 51 so as to fit with the locking member 51. The door 52 is fixed in a closed state by the locking pin 47 as a result of the locking pin 47 and the locking member 51 fitting together. This restricts (prohibits) the user from removing the cartridges 12 from the inside of the image forming apparatus 1.

The operation of the locking pin 47 is controlled by a locking control unit 94 (described later; see FIG. 5). The state of the locking pin 47 is switched between a state in which the door 52 can be opened (as indicated by the broken lines in FIG. 3A) and a state in which the door 52 is fixed in a closed state (as indicated by the solid lines in FIG. 3A).

Figure 3B:
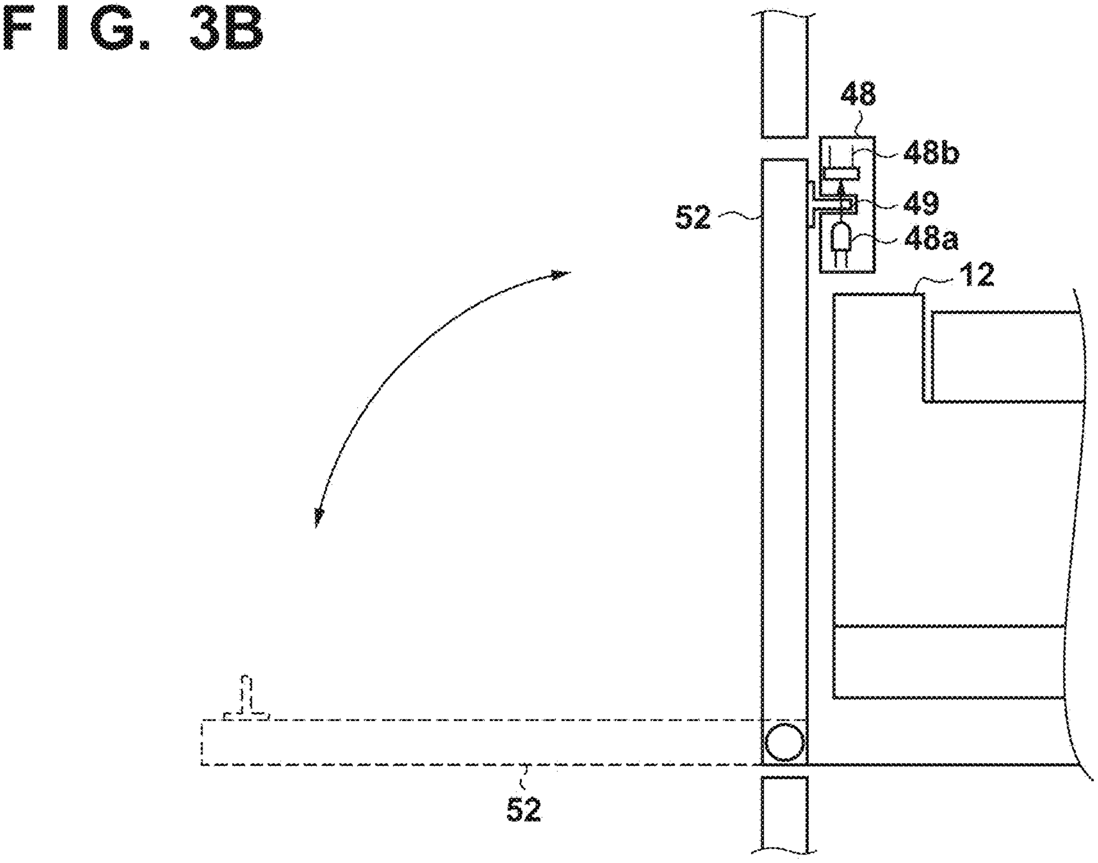

FIG. 3B is a schematic cross-sectional view illustrating an example of the configuration of a detection mechanism that detects whether the door 52 is open or closed. As described above, whether the door 52 is open or closed is detected using the door sensor 48. As one example, the door sensor 48 is constituted by a photointerrupter. The door sensor 48 includes a light-emitting unit 48*a* that emits light and a light-receiving unit 48*b* that receives light emitted from the light-emitting unit 48*a*.

Whether the door 52 is open or closed is detected based on output from the light-receiving unit 48*b*. When the door 52 closes from the open state, the member 49 is inserted between the light-emitting unit 48*a* and the light-receiving unit 48*b* in the door sensor 48. As a result, the light emitted from the light-emitting unit 48*a* is blocked by the member 49 and is not received by the light-receiving unit 48*b*. In this case, the door sensor 48 outputs a detection result indicating that the door 52 is detected as being closed.

On the other hand, when the door 52 opens from the closed state, the member 49 is not inserted between the light-emitting unit 48*a* and the light-receiving unit 48*b* in the door sensor 48. As a result, the light emitted from the light-emitting unit 48*a* is no longer blocked by the member 49 and is received by the light-receiving unit 48*b*. In this case, the door sensor 48 outputs a detection result indicating that the door 52 is detected as being open. A signal (information) indicating the detection result as to whether the door 52 is open or closed, output from the door sensor 48, is output to the control unit 60 (the locking control unit 94 (FIG. 5)).

Hardware Configuration

Figure 4:
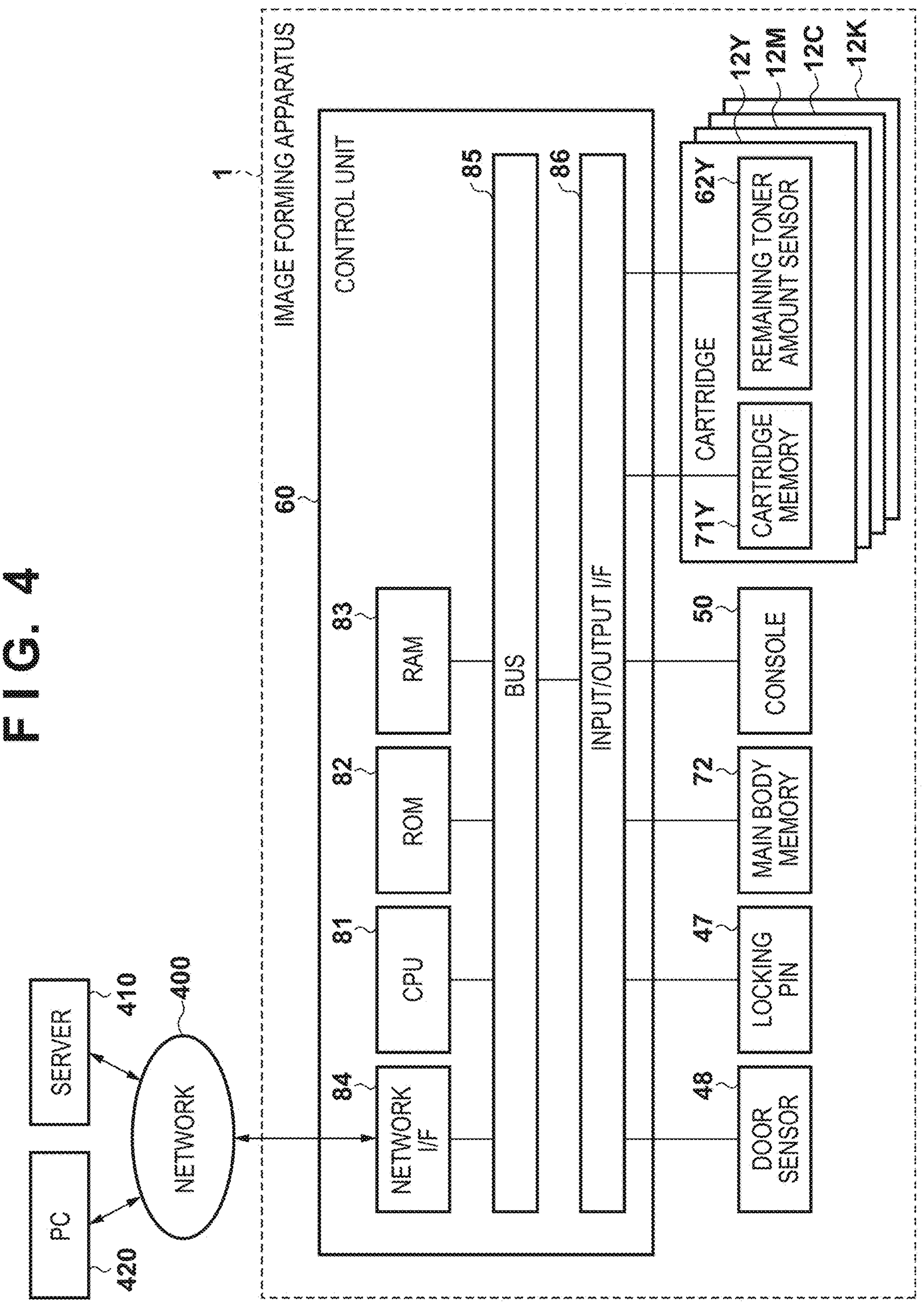
FIG. 4 is a block diagram illustrating an example of the hardware configuration of the image forming apparatus 1.

FIG. 4 is a block diagram illustrating an example of the hardware configuration of the image forming apparatus 1 of the present embodiment. The image forming apparatus 1 includes the control unit 60. The control unit 60 includes a CPU 81, a ROM 82, a RAM 83, a bus 85, an input/output I/F (interface) 86, and a network I/F 84. The control unit 60 is configured as a control board on which these devices are mounted (integrated) as components, for example. The devices in the control unit 60 are connected to each other by a bus 85 capable of two-way communication.

The CPU 81 controls the operations of the image forming apparatus as a whole by reading out programs stored in the ROM 82 and executing those programs. The CPU 81 uses a storage area of the RAM 83 as a work area. The CPU 81 can access the network I/F 84 and the input/output I/F 86 via the bus 85.

The locking pin 47, the door sensor 48, the main body memory 72, and the console 50 are connected to the input/output I/F 86. When the cartridge 12 (12Y, 12M, 12C, 12K) is mounted in the image forming apparatus, a cartridge memory 71 (71Y, 71M, 71C, 71K) and a remaining toner amount sensor 62 (62Y, 62M, 62C, 62K) disposed within the cartridge 12 are connected to the input/output I/F 86. The CPU 81 controls the devices connected to the input/output I/F 86 via the input/output I/F 86. Note that devices other than the devices illustrated in FIG. 4 may be connected to the input/output I/F 86. The remaining toner amount sensors 62Y, 62M, 62C, and 62K are sensors for detecting the remaining amount of toner in the corresponding toner containers 6Y, 6M, 6C, and 6K, respectively.

The network I/F 84 is connected to a network 400, including a local area network (LAN), the Internet, and the like. Using the network I/F 84, the CPU 81 can communicate with an external device that can be accessed over the network 400. In the present embodiment, the CPU 81 can communicate with a server 410 and a PC 420 over the network 400. The PC 420 is a terminal device operated by a user. The server 410 is a server device capable of communicating with the image forming apparatus 1 over the network 400, and is managed by a service provider.

Control Configuration

Figure 5:
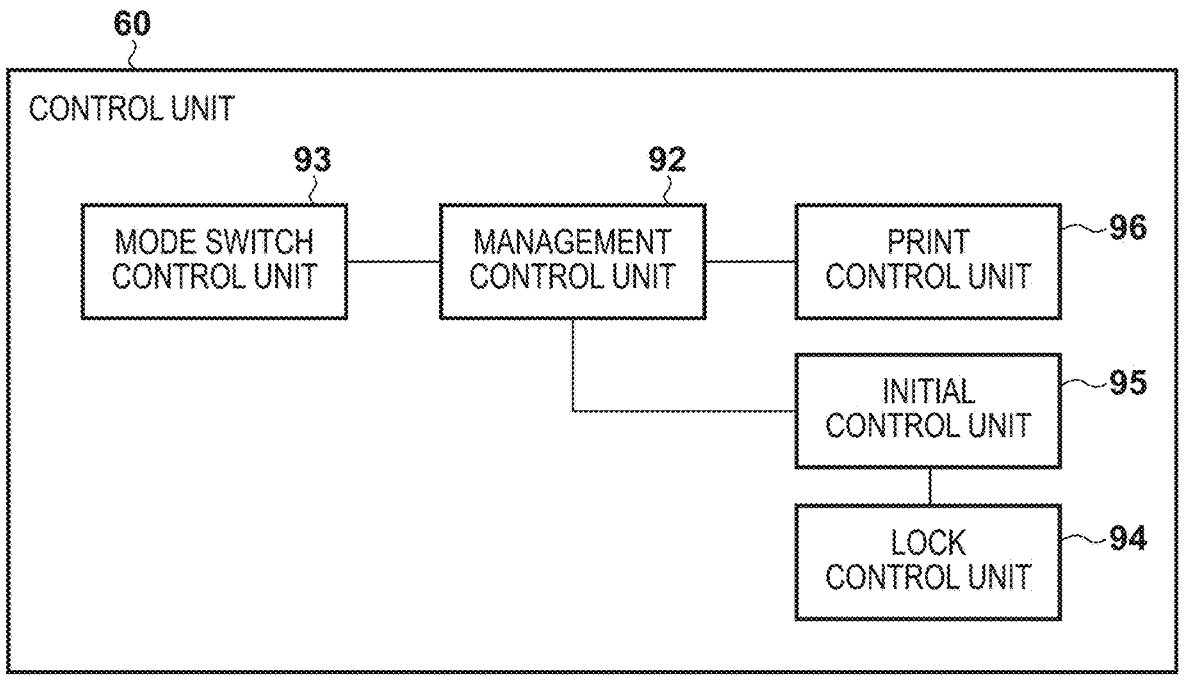
FIG. 5 is a block diagram illustrating an example of a control configuration of the image forming apparatus 1.

FIG. 5 is a block diagram illustrating an example of the control configuration of the image forming apparatus 1 of the present embodiment. The image forming apparatus 1 includes a management control unit 92, a mode switch control unit 93, the locking control unit 94, an initial control unit 95, and a print control unit 96 as function units implemented by the control unit 60 (CPU 81). These function units can be implemented by the control unit 60 (CPU 81) by the CPU 81 reading out programs stored in the ROM 82 and executing those programs.

The mode switch control unit 93 controls a contract state of the image forming apparatus 1 for the service provided by the service provider to switch between an uncontracted state ("uncontracted") and a contracted state ("contracted") based on a notification received from the server 410. The mode switch control unit 93 updates the information stored in the main body memory 72 (the contract state in FIG. 10D, described later) in response to the contract state switching. In the present embodiment, the contracted state ("contracted") is an example of a first state in which a contract for a service that uses a consumable unit of a specific type (a dedicated cartridge) provided by the service provider is in effect. The uncontracted state ("uncontracted") is an example of a second state in which the stated contract is not in effect.

The management control unit 92 performs control for managing the operations of the various units involved in printing operations. The print control unit 96 performs control related to the image forming operations (printing operations) of the image forming apparatus 1. For example, the print control unit 96 controls the driving of the various rollers used for feeding and conveying the sheets 21 (the paper feed roller 25, the conveyance roller 26, and the like), and controls the output of high voltages from a high-voltage power supply (charging voltages, developing voltages, transfer voltages, and the like). The print control unit 96 further controls the driving of a scanner motor included in the laser scanner 11, controls the emission by the laser light source included in the laser scanner 11, and controls the temperature of the fixer 30.

The locking control unit 94 controls the action of the locking pin 47 (the locking mechanism of the door 52), and also manages the information and the lifespan of the cartridge 12. The locking control unit 94 also determines conditions for locking and conditions for unlocking the door 52, and controls the action of the locking pin 47 in accordance with a result of the determination. The locking control unit 94 is configured to control the state of the locking mechanism of the door 52 to switch between a restricted state (a locked state), in which the cartridge 12 is restricted from being removed, and an unrestricted state (an unlocked state) in which the cartridge 12 is not restricted from being removed.

The initial control unit 95 performs initial processing such as processing for confirming (checking) the state of the cartridge 12 when the image forming apparatus 1 is powered on or the door 52 is closed, processing for detecting paper remaining in the conveyance path in the image forming apparatus 1, and the like.

Example of Information Stored in Memory

An example of the information stored in the cartridge memory 71 and the main body memory 72 will be described next with reference to FIGS. 10A to 10D. FIGS. 10A and 10B illustrate an example of the information stored in the cartridge memory 71Y. Although this example is an example of the information stored in the cartridge memory 71Y corresponding to the Y color, the same applies to the cartridges 12M, 12C, and 12K. FIGS. 10C and 10D illustrate an example of the information stored in the main body memory 72.

FIG. 10A illustrates an example of information unique to the cartridge 12Y, stored in the cartridge memory 71Y. The information illustrated here is information unique to the cartridge 12Y, set when the image forming apparatus 1 is shipped from the factory, and is not updated by the locking control unit 94.

"Serial number" (serial No.) is an identification number uniquely assigned to the cartridge 12Y. "Model information" indicates a model number of the image forming apparatus in which the cartridge 12Y is used. "Cartridge color information" indicates the toner color corresponding to the cartridge 12Y, and indicates either Y, M, C, or K. "Dedicated CRG (cartridge) information" indicates whether the cartridge 12Y is a dedicated cartridge for the service provided by the service provider. As an example, the dedicated CRG information includes "TRUE" if the cartridge 12Y is a dedicated cartridge for the service, and "FALSE" if the cartridge 12Y is not a dedicated cartridge (is a normal cartridge). In the present embodiment, the dedicated cartridge is an example of the consumable unit of the specific type provided by the service provider.

In the example in FIG. 10A, a serial number "12345", model information of "LBPXXXX", cartridge color information of "Y", and dedicated CRG information of "TRUE" are stored in the cartridge memory 71Y corresponding to Y. The dedicated CRG information is an example of information indicating whether the cartridge 12 is a dedicated cartridge (a consumable unit of the specific type). Based on the information stored in the cartridge memory 71 of the cartridge 12 (the consumable unit) mounted in the image forming apparatus 1, the locking control unit 94 can determine whether the cartridge is a dedicated cartridge (a consumable unit of the specific type).

FIG. 10B illustrates an example of information related to the lifespan of the cartridge 12Y, stored in the cartridge memory 71Y. A cumulative rotation time of the corresponding photosensitive drum 13Y, and a determination reference time used to determine the remaining lifespan of the photosensitive drum 13Y based on the cumulative rotation time, are held in the cartridge memory 71Y. The cumulative rotation time of the photosensitive drum 13Y is the cumulative time obtained by finding the total time for which the photosensitive drum 13Y has rotated. The cumulative rotation time held in the cartridge memory 71Y is updated as needed while the photosensitive drum 13 rotates. The determination reference time is a time, determined in advance, as the cumulative rotation time of the photosensitive drum 13Y for when the photosensitive drum 13Y reaches the end of its lifespan.

The locking control unit 94 obtains a remaining lifespan value based on the cumulative rotation time of the photosensitive drum 13Y using the values of the determination reference time and the cumulative rotation time held in the cartridge memory 71. For example, as illustrated in FIG. 10B, if the determination reference time for the photosensitive drum 13Y is 10,000 seconds and the cumulative rotation time is 6,000 seconds, a usage amount of the photosensitive drum 13Y corresponds to the ratio of the cumulative rotation time to the determination reference time, and is obtained as $6{,}000/10{,}000 \times 100 = 60$ [%]. The remaining lifespan value based on the cumulative rotation time of the photosensitive drum 13Y is 40% (=100%-60%).

Furthermore, a cumulative rotation distance of the corresponding photosensitive drum 13Y, and a determination reference distance used to determine the remaining lifespan of the photosensitive drum 13Y based on the cumulative rotation distance, are held in the cartridge memory 71Y. The cumulative rotation distance of the photosensitive drum 13Y is a cumulative distance obtained by finding the total distance at which the surface of the photosensitive drum 13Y has moved due to the photosensitive drum 13Y rotating. The cumulative rotation distance held in the cartridge memory 71Y is updated as needed while the photosensitive drum 13 rotates. The determination reference distance is a distance, determined in advance, as the cumulative rotation distance of the photosensitive drum 13Y for when the photosensitive drum 13Y reaches the end of its lifespan.

The locking control unit 94 obtains a remaining lifespan value related to the rotation distance of the photosensitive drum 13Y using the values of the determination reference distance and the cumulative rotation distance held in the cartridge memory 71. For example, as indicated in FIG. 10B, if the determination reference distance for the photosensitive drum 13Y is 5,000 m and the cumulative rotation distance is 3,500 m, the usage amount of the photosensitive drum 13Y corresponds to the ratio of the cumulative rotation distance to the determination reference distance, and is obtained as 3,500/5,000×100=70 [%]. The remaining lifespan value based on the cumulative rotation distance of the photosensitive drum 13Y is 30% (=100%−70%).

Furthermore, the cartridge memory 71Y holds the remaining amount of toner in the corresponding toner container 6, which is detected by the remaining toner amount sensor 62Y. The remaining amount of toner is updated as needed in response to detections by the remaining toner amount sensor 62Y. Note that the remaining amount of toner may be obtained by a method other than using the remaining toner amount sensor 62Y, such as obtaining the remaining amount of toner based on a cumulative value of the number of pixels in the image formed by the laser scanner 11Y.

The remaining lifespan value of the photosensitive drum 13Y based on the stated cumulative rotation time, the remaining lifespan value of the photosensitive drum 13Y based on the cumulative rotation distance, and the remaining amount of toner can be used as the remaining lifespan value indicating the remaining lifespan of the cartridge 12Y. In the present embodiment, as an example, the locking control unit 94 obtains the lowest of these three values as the remaining lifespan value indicating the remaining lifespan of the cartridge 12Y (the consumable unit), and stores the remaining lifespan value in the main body memory 72. In the example in FIG. 10B, the remaining lifespan value of the photosensitive drum 13Y based on the cumulative rotation time is 40%, the remaining lifespan value of the photosensitive drum 13Y based on the cumulative rotation distance is 30%, and the remaining amount of toner is 25%. In this case, the locking control unit 94 determines that the remaining lifespan value of the cartridge 12Y is 25%, and stores the determined remaining lifespan value in the main body memory 72.

The locking control unit 94 may determine the remaining lifespan value indicating the remaining lifespan of the cartridge 12Y based on, for example, one of the remaining lifespan value of the photosensitive drum 13Y based on the stated cumulative rotation time, the remaining lifespan value of the photosensitive drum 13Y based on the cumulative rotation distance, and the remaining amount of toner. Another index value related to the lifespan of the cartridge 12 may be used as the remaining lifespan value of the cartridge 12Y. In this manner, the locking control unit 94 (the control unit 60) can be configured to obtain the remaining lifespan value based on at least one of the cumulative time obtained by finding the total time for which the photosensitive member (the photosensitive drum 13) has rotated, the cumulative distance obtained by finding the total distance the surface of the photosensitive member has moved due to rotation of the photosensitive member, or the remaining amount of toner in the toner container. Note that if the consumable unit that can be mounted in and removed from the image forming apparatus 1 is configured as a toner container, the remaining lifespan value can be obtained based on the remaining amount of toner in the toner container.

As illustrated in FIG. 10B, an unlocking threshold is further stored in the cartridge memory 71Y. The unlocking threshold is set as a threshold used to determine whether the locking mechanism is to unlock the door 52 based on the remaining lifespan value of the cartridge 12Y. As will be described later, in the present embodiment, the locking control unit 94 controls the door 52 to unlock so as to allow the cartridge 12Y to be replaced when the remaining lifespan value of the cartridge 12Y is not greater than the unlocking threshold (in this example, not greater than 5%). Note that the locking control unit 94 performs the same control for the cartridges 12M, 12C, and 12K.

FIG. 10C illustrates an example of the information unique to the image forming apparatus 1, stored in the main body memory 72. The information illustrated here is information unique to the image forming apparatus 1, set when the image forming apparatus 1 is shipped from the factory, and is not updated by the locking control unit 94.

"Serial number" (serial No.) is an identification number uniquely assigned to the image forming apparatus 1. "Model information" indicates a model number of the image forming apparatus 1. In this example, a serial number "L01234" and model information "LBPXXXX" are stored in the main body memory 72.

FIG. 10D illustrates an example of information related to the cartridge 12, stored in the main body memory 72. The information illustrated in this figure is updated as needed in accordance with the usage situation of the image forming apparatus 1. "Contract state" indicates whether a contract for a service using a dedicated cartridge provided by the service provider has been made (is in effect) for the image forming apparatus 1. The contract state stored in the main body memory 72 is set to "contracted" if the service is contracted, and to "uncontracted" if the service is not contracted (is uncontracted). In this manner, the main body memory 72 stores information indicating the contract state of the image forming apparatus 1.

The main body memory 72 further holds information read out from the cartridge memory 71 of each cartridge 12, as well as the remaining lifespan value obtained based on the read-out information. In this example, the serial number, the remaining lifespan value, and the dedicated CRG information for each cartridge 12 are held in the main body memory 72.

Processing Sequence Related to Subscription Contract

Figure 6:
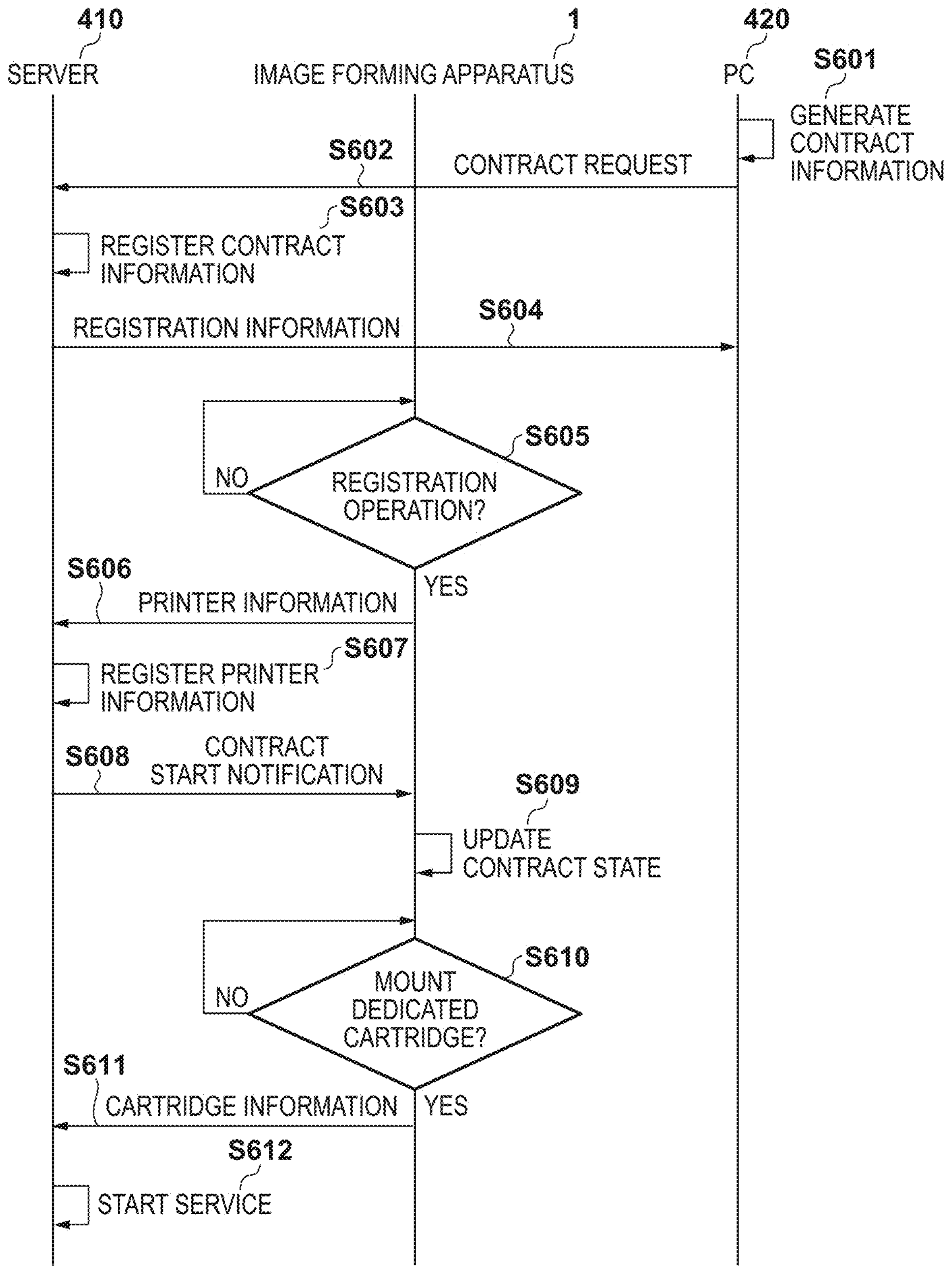
FIG. 6 is a sequence chart illustrating an example of a processing sequence related to a subscription contract.

A processing sequence related to a subscription contract will be described next with reference to FIG. 6. In the present embodiment, a contract for a service in which a consumable unit of a specific type provided by a service provider is used (a subscription contract) is made with the image forming apparatus 1. As described above, in the present embodiment, a dedicated cartridge for the service is provided by the service provider as the consumable unit of the specific type. Under this contract, the service provider provides a printing service in which a flat fee or a page-by-page fee is charged for forming images using the consumable unit of the specific type.

First, in step S601, in accordance with inputs made by a user, the PC 420 generates contract information for entering into a contract related to the provision of the service by the service provider. The user inputs the information through a website screen displayed in a display unit of the PC 420 in a web browser. The website screen is provided to the PC 420 from the server 410, which is managed by the service provider. The contract information generated by the PC 420 includes, for example, a name, an address, a payment method, an email address, and the model information of the image forming apparatus (printer) to be used (e.g., "LBPXXXX").

When the generation of the contract information is complete, in step S602, the PC 420 sends a contract request including the contract information to the server 410. Note that the PC 420 and the server 410 communicate over the network 400. For example, after generating the contract information, the PC 420 displays, in the web browser, a dialog box for the user to make a final confirmation as to whether to enter into the contract, and sends the contract request in response to an OK button being pressed in the dialog box.

Upon receiving the contract request from the PC 420, in step S603, the server 410 registers the contract information by storing the contract information included in the received contract request in a non-volatile memory (not shown). Then, in step S604, the server 410 sends registration information for registration with the image forming apparatus 1 to the PC 420 as a response to the contract request. For example, the registration information may be sent by sending an email to the email address included in the contract information. The registration information to be sent includes, for example, a notification indicating that the registration of the contract information is complete, a sequence for starting the provision of the service, and a registration code for input to the image forming apparatus 1 (e.g., "CD123456"). Note that the registration code is saved in the non-volatile memory in association with the contract information.

After the registration information is sent, a dedicated cartridge for the contract-based service is sent to the contracting user (the user of the PC 420 and the image forming apparatus 1) by the service provider. Note that the service provider sends the dedicated cartridge to the address included in the contract information.

In step S605, the image forming apparatus 1 accepts a registration operation related to the contract with the service provider through the console 50. The control unit 60 of the image forming apparatus 1 accepts the registration operation, which is made by the user, by displaying an operation screen (an operation menu) for the registration operation in the console 50. In step S606, the image forming apparatus 1 sends printer information to the server 410 in accordance with the input made in the registration operation. The printer information includes, for example, the serial number and model information stored in the main body memory 72 of the image forming apparatus 1, the registration code that has been input, and the IP address of the image forming apparatus 1. Note that the image forming apparatus 1 and the server 410 communicate over the network 400.

Upon receiving the printer information from the image forming apparatus 1, in step S607, the server 410 confirms whether the received printer information matches the contract information. Specifically, the server 410 refers to the contract information associated with the registration code included in the received printer information, and confirms that the model information included in the contract information is the same as the model information included in the printer information. If the printer information matches the contract information, the server 410 registers the printer information by storing the printer information in the non-volatile memory in association with the contract information. When the registration of the printer information is complete, in step S608, the server 410 sends, to the image forming apparatus 1, a contract start notification indicating that the contract for the provision of the service by the service provider has been started (the contract has been established).

Upon receiving the contract start notification from the server 410, in step S609, the image forming apparatus 1 (the mode switch control unit 93) transitions the image forming apparatus 1 from the uncontracted state (the second state) to the contracted state (the first state) in accordance with the notification. Furthermore, the image forming apparatus 1 (the mode switch control unit 93) updates the information stored in the main body memory 72 (the contract state) from "uncontracted" to "contracted".

The user performs the above-described registration operation, and furthermore mounts the dedicated cartridge delivered by the service provider in the image forming apparatus 1. If a cartridge of a type other than the dedicated cartridge (a normal cartridge or the like) is mounted in the image forming apparatus 1 as the cartridge 12, that mounted cartridge is replaced with the dedicated cartridge. In step S610, the image forming apparatus 1 (the locking control unit 94) determines whether a dedicated cartridge has been mounted as the cartridge 12 (12Y, 12M, 12C, 12K) based on the dedicated CRG information stored in the cartridge memory 71.

In accordance with the dedicated cartridge having been mounted as the cartridge 12 (12Y, 12M, 12C, 12K), in step S611, the image forming apparatus 1 sends the cartridge information about the cartridge 12 to the server 410. The cartridge information includes the serial number, the remaining lifespan value, and the dedicated CRG information obtained from the cartridge memory 71.

In step S612, the server 410 confirms that all the cartridges 12 (12Y, 12M, 12C, 12K) mounted in the image forming apparatus 1 are dedicated cartridges based on the cartridge information received from the image forming apparatus 1. In accordance with the confirmation, the server 410 starts providing the service according to the contract with the contracting user. Specifically, the service provider (the server 410) provides a printing service in which a flat fee or a page-by-page fee is charged for forming images using the dedicated cartridge provided to the image forming apparatus 1 under the contract.

In this manner, when the subscription contract described above is entered into, a dedicated cartridge (a consumable unit of a specific type) for the service provided by the service provider is sent from the service provider to the user. It is necessary for the user themselves to mount the dedicated cartridge as the cartridge 12 in their image forming apparatus 1.

When the image forming apparatus 1 of the present embodiment transitions to the contracted state, in which the contract described above is in effect, the door 52 is locked by the locking mechanism to make it possible to use up the dedicated cartridge by the time the lifespan thereof is reached. In this case, if, after the image forming apparatus 1 has transitioned to the contracted state, the door 52 is locked by the locking mechanism when the dedicated cartridge is mounted, a situation can arise in which the door 52 is locked in a state where the dedicated cartridge and the normal cartridge are mounted at the same time. Such a situation can occur, for example, if the user accidentally closes the door 52 while in the process of replacing a plurality of cartridges. Here, it is necessary to unlock the door 52 in order to continue replacing the cartridges, but it may be necessary to perform complicated operations in the console 50, and, in some cases, request the service provider to dispatch a worker, to unlock the door 52.

Processing Sequence for Locking Door

Figure 7A:
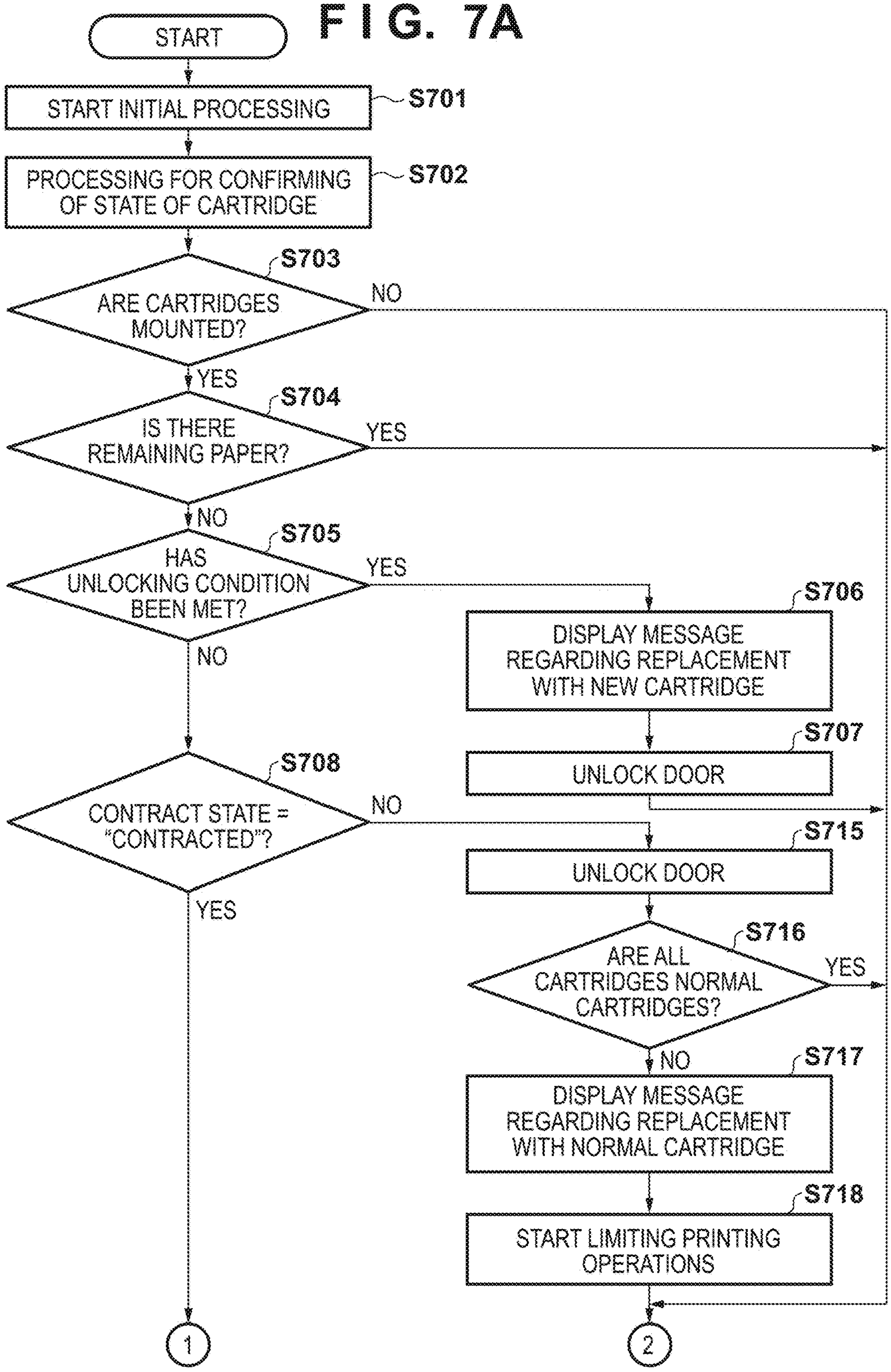
FIGS. 7A and 7B are flowcharts illustrating an example of a processing sequence for locking the door 52.
Figure 7B:
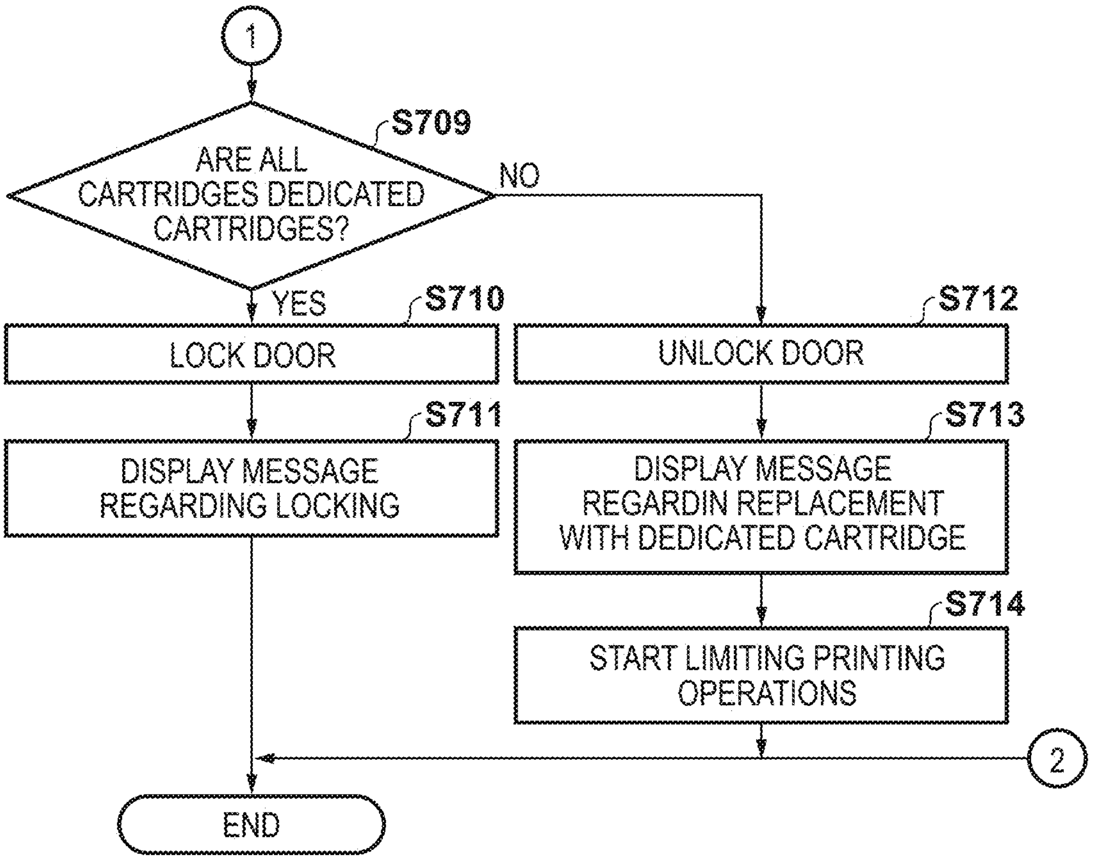

FIGS. 7A and 7B are flowcharts illustrating an example of a processing sequence for locking the door 52 in the image forming apparatus 1 according to the present embodiment. The control unit 60 starts executing the processing according to the sequence illustrated in FIGS. 7A and 7B when the image forming apparatus 1 is powered on or the door 52 is closed. In this processing, the control unit 60 starts initial processing (initialization processing), and when the initial processing is complete, the locking mechanism of the door 52 locks the door 52 to restrict the cartridges 12 from being removed from the image forming apparatus 1, or unlocks the door 52.

In step S701, the management control unit 92 instructs the initial control unit 95 to start the initial processing, and the initial control unit 95 starts executing the initial processing in response to the instruction from the management control unit 92.

In step S702, the initial control unit 95 performs processing for confirming (checking) the state of the cartridge 12 as the initial processing. Specifically, the initial control unit 95 reads the information stored in the cartridge memory 71 (see FIGS. 10A and 10B) into the RAM 83, and checks the state of the cartridge 12 based on the read-out information.

When the processing for confirming the cartridge 12 is complete, in step S703, the initial control unit 95 determines whether all the cartridges 12 (the cartridges 12Y, 12M, 12C, and 12K) are mounted in the image forming apparatus 1. Whether each cartridge 12 is mounted is detected based on, for example, the output of a detection sensor (not shown) provided in a mounting part (in the image forming apparatus 1) where the respective cartridges 12 are mounted.

Alternatively, whether each cartridge 12 is mounted may be detected based on an output from a detection sensor (not shown) mounted in the cartridge 12 to the control unit 60.

The initial control unit 95 moves the sequence to step S704 if all the cartridges 12 are mounted, and ends the sequence if one of the cartridges is not mounted. When the sequence ends, the initial control unit 95 may notify the user that a cartridge 12 is not mounted by, for example, displaying a message in the console 50. The user may therefore be prompted to mount the cartridge 12 which is not mounted in the image forming apparatus 1.

In step S704, the initial control unit 95 determines whether there is paper remaining in the image forming apparatus 1. Whether there is paper remaining can be determined based on the output of one or more paper detection sensors (not shown) disposed in the conveyance path. The initial control unit 95 moves the sequence to step S705 if it is determined that there is no paper remaining in the apparatus, and ends the sequence if it is determined that there is paper remaining in the apparatus. When the sequence ends, the initial control unit 95 may notify the user that there is paper remaining in the apparatus (i.e., that a jam has occurred) by, for example, displaying a message in the console 50. Through this, the user may be prompted to remove the remaining paper.

If the sequence has moved to step S705, the initial control unit 95 causes the locking control unit 94 to start executing processing related to locking or unlocking the door 52. In step S705, the locking control unit 94 determines whether a canceling condition (an unlocking condition) for unlocking the door 52 is met. The locking control unit 94 moves the sequence to step S706 if the unlocking condition is met, and moves the sequence to step S708 if the unlocking condition is not met.

In the present embodiment, the remaining lifespan value of at least one of the cartridges 12Y, 12M, 12C, and 12K being not greater than an unlocking threshold is set as the unlocking condition. Accordingly, the locking control unit 94 moves the sequence to step S706 if the remaining lifespan value of at least one of the cartridges 12 is not greater than the unlocking threshold, and moves the sequence to step S708 when such is not the case. As described above, the locking control unit 94 obtains the remaining lifespan value of each cartridge 12 based on the information stored in the cartridge memory 71 of the cartridge, and stores the obtained remaining lifespan value in the main body memory 72 for use. In addition, the locking control unit 94 reads out the unlocking threshold stored in the cartridge memory 71 of each cartridge 12 and uses the threshold for the determination in step S705.

In step S706, the locking control unit 94 displays, in the console 50, a message for prompting the user to replace the cartridge with a new cartridge, with respect to the cartridge 12 for which the remaining lifespan value has been determined to be not greater than the unlocking threshold (i.e., that has met the unlocking condition). Then, in step S707, the locking control unit 94 operates the locking pin 47 to unlock the door 52, after which the sequence ends.

Meanwhile, in step S708, the locking control unit 94 determines the above-described contract state of the provision of the service by the service provider (whether the state is the contracted state or the uncontracted state) based on the information (the contract state) stored in the main body memory 72. The locking control unit 94 moves the sequence to step S709 if the contract state is "contracted", and to step S716 if the contract state is "uncontracted".

When Contract State is "Contracted"

In step S709, the locking control unit 94 determines whether all the cartridges 12 (the cartridges 12Y, 12M, 12C, and 12K) are dedicated cartridges for the service based on the contract. This determination is made based on whether the dedicated CRG information stored in the cartridge memory 71 of each cartridge 12 is "TRUE". The locking control unit 94 moves the sequence to step S710 if all the cartridges 12 are dedicated cartridges, and moves the sequence to step S712 if not.

In step S710, the locking control unit 94 operates the locking pin 47 to lock the door 52. In this manner, the locking control unit 94 sets the locking mechanism of the door 52 to a locked state (a restricted state) when all the cartridges 12 (consumable units) mounted in the image forming apparatus 1 are dedicated cartridges (consumable units of a specific type). Then, in step S711, the locking control unit 94 displays a message indicating that the door 52 has been locked (that the locking mechanism has been set to the restricted state) in the console 50, and the sequence ends. Notifying the user that the door 52 has been locked in this manner enables the user to recognize that the door 52 not opening is not caused by a malfunction in the image forming apparatus 1.

Note that along with the stated message, the locking control unit 94 may display the unlocking condition for unlocking the door 52 (canceling the restricted state) in the console 50. In this case, the locking control unit 94 displays, in the console 50, a message such as "Door has been locked. Door will unlock when remaining lifespan of cartridge drops below 5%". This enables the user to recognize when the door 52 will open automatically.

Meanwhile, in step S712, the locking control unit 94 operates the locking pin 47 to unlock the door 52. In this manner, the image forming apparatus 1 of the present embodiment is configured to unlock the door 52 if, when the contract state is "contracted", at least one of the cartridges mounted as a cartridge 12 is a normal cartridge rather than a dedicated cartridge. In other words, the locking control unit 94 sets the locking mechanism of the door 52 to an unlocked state (an unrestricted state) when at least one of the cartridges 12 (consumable units) mounted in the image forming apparatus 1 is not a dedicated cartridge (consumable unit of a specific type). Such processing makes it possible to avoid a situation where, for example, the door 52 is locked with a normal cartridge mounted in the image forming apparatus 1 when the contract state has switched from "uncontracted" to "contracted". This improves the usability with respect to replacing consumables (cartridges) when switching contract states.

After the door 52 is unlocked, in step S713, the locking control unit 94 displays, in the console 50, a message prompting the user to replace the cartridge 12 that is not a dedicated cartridge (i.e., is a normal cartridge) with a dedicated cartridge. For example, if the cartridge 12Y is a normal cartridge and the cartridges 12M, 12C, and 12K are dedicated cartridges, the locking control unit 94 displays a message prompting the cartridge 12Y to be replaced with a dedicated cartridge. This makes it possible to make the user aware that the image forming apparatus 1 will be used without the service based on the contract being provided properly.

Then, in step S714, the locking control unit 94 notifies the management control unit 92 regarding a limitation on printing operations. The management control unit 92 starts limiting the printing operations in response to the notification from the locking control unit 94. The limitation on printing operations includes, for example, limiting the number of printed sheets (number of images formed). In this case, the management control unit 92 performs control to prohibit the printing operations from being executed when the number of printed sheets exceeds a predetermined number (e.g., 100 sheets) after the start of the limitation on the printing operations. The management control unit 92 performs control to prohibit all printing operations when a number of printable sheets is set to 0.

The limitation on the printing operations may include limiting the amount of toner used to form images by performing the printing operations in a toner-saving mode (a second mode) that reduces the darkness of the images formed (reduces the amount of toner used) compared to a normal mode (a first mode). For example, the management control unit 92 converts input image data to reduce the number of times a laser light source of the laser scanner 11 emits light, or sets a bias voltage for the charging roller 15 or the developing roller 16 so as to reduce the amount of toner that adheres to the photosensitive drum 13.

The limitation on the printing operations may also include switching to a printing mode that preferentially uses a normal cartridge aside from the dedicated cartridge. In other words, the limitation on the printing operations may include preferentially using a type of consumable unit (cartridge) other than the specific type. For example, if the cartridge 12K corresponding to K (black) is a normal cartridge, the management control unit 92 can perform printing operations in a black and white printing mode that converts the input image data to black and white image data in order to preferentially use the cartridge 12K. In addition, if the cartridges 12Y, 12M, and 12C corresponding to Y, M, and C are normal cartridges, the management control unit 92 can perform printing operations in a black and white printing mode that converts the input image data to form K by superimposing Y, M, and C. Limiting the printing operations in this manner makes it possible to reduce situations where the dedicated cartridge is consumed without the service based on the contract being provided properly.

When Contract State is "Uncontracted"

If the sequence as moved from step S708 to step S715, in step S715, the locking control unit 94 operates the locking pin 47 to unlock the door 52. Then, in step S716, the locking control unit 94 determines whether all the cartridges 12 (the cartridges 12Y, 12M, 12C, and 12K) are normal cartridges. This determination is made based on whether the dedicated CRG information stored in the cartridge memory 71 of each cartridge 12 is "FALSE". The locking control unit 94 ends the sequence if all the cartridges 12 are normal cartridges, and moves the sequence to step S717 if not.

In step S717, the locking control unit 94 displays, in the console 50, a message prompting the user to replace the cartridge 12 that is a dedicated cartridge with a normal cartridge. For example, if the cartridge 12Y is a dedicated cartridge and the cartridges 12M, 12C, and 12K are normal cartridges, the locking control unit 94 displays a message prompting the cartridge 12Y to be replaced with a normal cartridge. This makes it possible to make the user aware that the image forming apparatus 1 will be used without the service based on the contract being provided.

Then, in step S718, the locking control unit 94 notifies the management control unit 92 regarding a limitation on printing operations. Like in step S714, the management control unit 92 starts limiting the printing operations in response to the notification from the locking control unit 94. Limiting the printing operations in this manner makes it possible to reduce situations where the dedicated cartridge is consumed without the service based on the contract being provided properly.

As described above, the image forming apparatus 1 according to the present embodiment can be configured such that a consumable unit of a specific type (a dedicated cartridge) and a normal consumable unit aside from the specific type (a normal cartridge) can be mounted therein. The image forming apparatus 1 includes the locking mechanism for the door 52, which, when a plurality of consumable units (cartridges) which can be mounted in and removed from the image forming apparatus 1 are mounted, restricts the plurality of consumable units from being removed from the image forming apparatus 1. The control unit 60 (the locking control unit 94) controls the state of the locking mechanism to switch between a restricted state (a locked state) in which the plurality of consumable units are restricted from being removed, and an unrestricted state (an unlocked state) in which the plurality of consumable units are not restricted from being removed. When a contract for a service for using the consumable unit of the specific type provided by the service provider is in effect (the first state), the control unit 60 (the locking control unit 94) sets the locking mechanism to the restricted state (the locked state) when the plurality of consumable units mounted in the image forming apparatus 1 are all consumable units of the specific type. On the other hand, when, in the first state, at least one of the plurality of consumable units mounted in the image forming apparatus 1 is not a consumable unit of the specific type (i.e., at least one of the plurality of consumable units is a normal consumable unit), the control unit 60 (the locking control unit 94) sets the locking mechanism to the unrestricted state (the unlocked state).

In this manner, in the image forming apparatus 1 in which a plurality of consumable units (cartridges 12) can be mounted, the door 52 is unlocked by the locking mechanism if all of the mounted consumable units are not consumable units of the specific type (dedicated cartridges) (i.e., if at least one of the consumable units is a normal consumable unit (a normal cartridge)). This prevents a situation in which the door 52 is locked by the locking mechanism when a dedicated cartridge and a normal cartridge are mounted at the same time. This makes it possible to improve the usability when replacing a removable consumable unit in the image forming apparatus 1.

Although the present embodiment describes an example in which the consumable units that can be mounted in and removed from the image forming apparatus 1 are configured as process cartridges (the cartridges 12), in the present embodiment, the consumable unit can be applied in other consumable units, such as toner containers. Additionally, although a plurality of consumable units (cartridges 12) can be mounted in the image forming apparatus 1 of the present embodiment, the configuration may be such that only a single consumable unit (cartridge 12) can be mounted (i.e., the apparatus is configured as a black and white image forming apparatus). In this case, when, in the contracted state (the first state), the consumable unit mounted in the image forming apparatus 1 is a consumable unit of the specific type, the control unit 60 (the locking control unit 94) can set the locking mechanism to the restricted state (the locked state). On the other hand, when, in the contracted state (the first state), the consumable unit mounted in the image forming apparatus 1 is not a consumable unit of the specific type, the control unit 60 (the locking control unit 94) can set the locking mechanism to the unrestricted state (the unlocked state). This makes it possible to improve the usability when replacing the consumable unit, in the same manner as an image forming apparatus in which a plurality of consumable units (cartridges 12) can be mounted.

Second Embodiment

A second embodiment will describe an example in which the image forming apparatus 1 is configured such that a plurality of consumable units can be mounted therein, and a locking mechanism (a restriction unit) for a door that enables access to the consumable units is configured such that each of the plurality of consumable units is individually restricted from being removed. Parts that are the same as in the first embodiment will be given the same reference signs, and descriptions thereof will be omitted.

Figure 8:
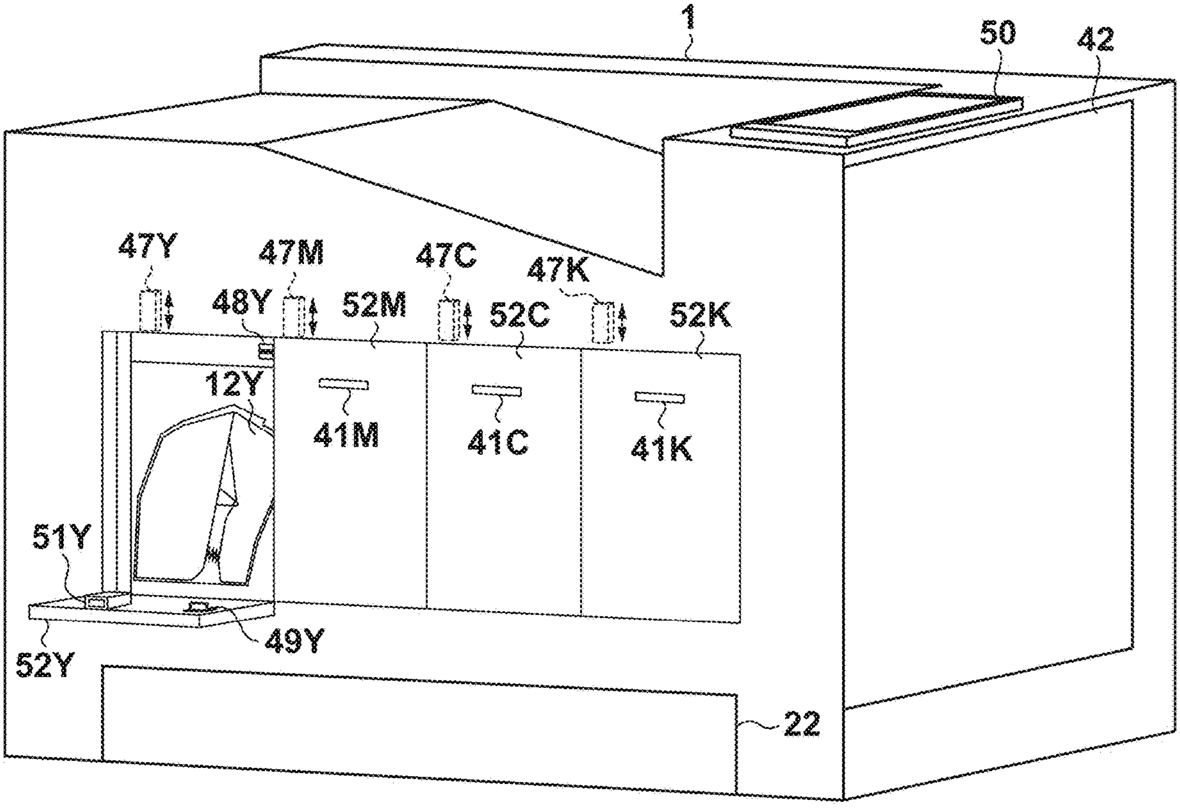
FIG. 8 is a schematic perspective view illustrating an example of a configuration related to the mounting and removal of a cartridge 12 (a second embodiment).

FIG. 8 is a schematic perspective view illustrating an example of a configuration related to the mounting and removal of the cartridge 12 in the image forming apparatus 1 of the present embodiment. In the present embodiment, individual doors 52Y, 52M, 52C, and 52K are provided for corresponding ones of the consumable units (the cartridges 12Y, 12M, 12C, and 12K) mounted in (inside) the image forming apparatus 1. Each of door 52 is provided with the locking pin 47, the locking member 51, the door sensor 48, and the member 49. The locking pin 47 and the locking member 51 constitute a locking mechanism that locks the corresponding door 52 closed. The locking control unit 94 is configured to control the state of the locking mechanism of the corresponding door 52 individually for each consumable unit (cartridge 12).

The processing sequence for locking each door 52 in the image forming apparatus 1 according to the present embodiment is the same as in the first embodiment (FIGS. 7A and 7B). However, step S712 is executed according to the sequence illustrated in FIG. 9.

Figure 9:
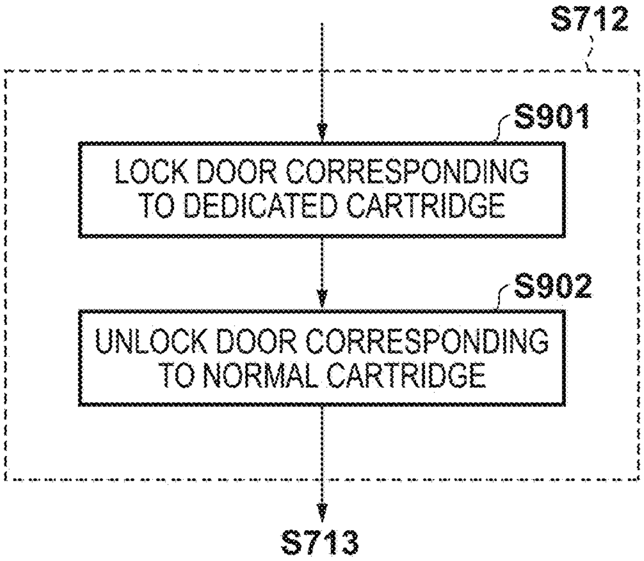
FIG. 9 is a flowchart illustrating an example of the processing sequence of step S712 (FIG. 7B) (the second embodiment).

In the present embodiment, when the sequence has moved from step S709 to step S712, the locking control unit 94 performs steps S901 and S902, illustrated in FIG. 9. In step S901, the locking control unit 94 locks the door 52 corresponding to the dedicated cartridge among the cartridges 12 mounted in the image forming apparatus 1. Furthermore, in step S902, the locking control unit 94 unlocks the door 52 corresponding to the normal cartridge among the cartridges 12 mounted in the image forming apparatus 1.

In this manner, in the present embodiment, when in the contracted state (the first state), the control unit 60 (the locking control unit 94) controls the state of the locking mechanism of the doors 52 such that, of the consumable units (cartridges 12) mounted in the image forming apparatus 1, consumable units of the specific type (dedicated cartridges) are restricted from being removed, and consumable units of a type other than the specific type (normal cartridges) are not restricted from being removed. Through this, when the consumable units (cartridges 12) need to be replaced while the image forming apparatus 1 is in the contracted state, the opening and closing of doors for cartridges which do not need to be replaced can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-143916, filed Sep. 5, 2023, which is hereby incorporated by reference herein in its entirety.

What is claimed is:

1. An image forming apparatus in which a consumable unit of a specific type and a normal consumable unit not of the specific type can be mounted, the image forming apparatus comprising:

a restricting unit configured to, when a plurality of consumable units used to form an image on a recording material are mounted in the image forming apparatus, restrict the plurality of consumable units from being removed from the image forming apparatus; and a control unit configured to control a state of the restricting unit to switch between a restricted state in which the plurality of consumable units are restricted from being removed and an unrestricted state in which the plurality of consumable units are not restricted from being removed, wherein in a first state in which a contract for a service for using the consumable unit of the specific type provided by a service provider is in effect, the control unit sets the restricting unit to the restricted state in a case where all the plurality of consumable units mounted in the image forming apparatus are consumable units of the specific type, and sets the restricting unit to the unrestricted state in a case where at least one of the plurality of consumable units mounted in the image forming apparatus is the normal consumable unit.

2. The image forming apparatus according to claim 1, wherein in a second state in which the contract is not in effect, the control unit sets the restricting unit to the unrestricted state.

3. The image forming apparatus according to claim 1, wherein each consumable unit that can be mounted in the image forming apparatus includes a memory storing information indicating whether or not the consumable unit is the consumable unit of the specific type, and the control unit determines whether or not the consumable unit mounted in the image forming apparatus is the consumable unit of the specific type based on the information stored in the memory of the consumable unit.

4. The image forming apparatus according to claim 1, wherein when setting the restricting unit to the restricted state, the control unit displays a message indicating that the restricting unit has been set to the restricted state in a display unit of the image forming apparatus.

5. The image forming apparatus according to claim 4, wherein when setting the restricting unit to the restricted state, the control unit further displays, in the display unit, a canceling condition for canceling the restricted state.

6. The image forming apparatus according to claim 5, wherein the canceling condition is that a remaining lifespan value indicating a remaining lifespan of any one of the plurality of consumable units is not greater than a threshold.

7. The image forming apparatus according to claim 6, wherein each of the plurality of consumable units is configured as a cartridge including a toner container that contains toner, a photosensitive member that forms an electrostatic latent image, and a developing unit that develops the electrostatic latent image formed on the photosensitive member using the toner, and the control unit obtains the remaining lifespan value based on at least one of a cumulative time obtained by finding a total time for which the photosensitive member has rotated, a cumulative distance obtained by finding a total distance a surface of the photosensitive member has moved due to rotation of the photosensitive member, and a remaining amount of toner in the toner container.

8. The image forming apparatus according to claim 6, wherein each of the plurality of consumable units is configured as a toner container containing toner, and the control unit obtains the remaining lifespan value based on a remaining amount of toner in the toner container.

9. The image forming apparatus according to claim 1, wherein in a case where, in the first state, at least one of the plurality of consumable units mounted in the image forming apparatus is the normal consumable unit, the control unit displays a message prompting a user to replace the normal consumable unit with the consumable unit of the specific type in the display unit of the image forming apparatus.

10. The image forming apparatus according to claim 9, further comprising:

a limiting unit configured to limit an image forming operation in a case where, in the first state, at least one of the plurality of consumable units mounted in the image forming apparatus is the normal consumable unit.

11. The image forming apparatus according to claim 1, wherein in a case where, in a second state in which the contract is not in effect, at least one of the plurality of consumable units mounted in the image forming apparatus is the consumable unit of the specific type, the control unit displays a message prompting a user to replace the consumable unit of the specific type with the normal consumable unit in the display unit of the image forming apparatus.

12. The image forming apparatus according to claim 11, further comprising:

a limiting unit configured to limit an image forming operation in a case where, in the second state, at least one of the plurality of consumable units mounted in the image forming apparatus is the consumable unit of the specific type.

13. The image forming apparatus according to claim 10, wherein limiting the image forming operation includes at least one of limiting a number of images formed, limiting an amount of toner used to form images, and prioritizing the normal consumable unit.

14. The image forming apparatus according to claim 1, wherein the restricting unit is configured to individually restrict each of the plurality of consumable units mounted in the image forming apparatus from being removed, and the control unit controls a state of the restricting unit such that in the first state, of the plurality of consumable units mounted in the image forming apparatus, the consumable unit of the specific type is restricted from being removed, and the normal consumable unit is not restricted from being removed.

15. The image forming apparatus according to claim 1, wherein the consumable unit of the specific type is a dedicated consumable unit for the service.

16. The image forming apparatus according to claim 1, wherein the service is a printing service in which a flat fee or a page-by-page fee is charged for forming images using the consumable unit of the specific type.

17. The image forming apparatus according to claim 1, further comprising:

a door that, when open, enables access to the plurality of consumable units mounted in the image forming apparatus, and when closed, disables access to the plurality of consumable units mounted in the image forming apparatus, wherein the restricting unit is a locking mechanism that locks the door closed.

18. The image forming apparatus according to claim 1, further comprising:

a storage unit configured to store information indicating a contract state of the image forming apparatus, wherein the control unit is configured to:

determine whether or not the image forming apparatus is in the first state based on the information stored in the storage unit; and in a second state in which the contract is not in effect, cause the image forming apparatus to transition from the second state to the first state and update the information stored in the storage unit in accordance with a notification indicating a start of the contract, the notification being received from a server device that can be communicated with over a network.

* * * * *